US009313578B2

(12) United States Patent
Pang (10) Patent No.: US 9,313,578 B2
(45) Date of Patent: Apr. 12, 2016

(54) SENSOR DEVICE INTEGRATED WITH ULTRASONIC TRANSDUCER AND MICROPHONE AND MANUFACTURING METHOD THEREOF

(71) Applicant: NATIONAL KAOHSIUNG UNIVERSITY OF APPLIED SCIENCES, Kaohsiung (TW)

(72) Inventor: Da-Chen Pang, Kaohsiung (TW)

(73) Assignee: National Kaosiung University of Applied Sciences, Kaohsiung (TW)

( * ) Notice: Subject to any disclaimer, the term of this patent is extended or adjusted under 35 U.S.C. 154(b) by 76 days.

(21) Appl. No.: 14/454,903

(22) Filed: Aug. 8, 2014

(65) Prior Publication Data

US 2015/0281845 A1 Oct. 1, 2015

(30) Foreign Application Priority Data

Mar. 26, 2014 (TW) .............................. 103111188 A (51) Int. Cl.
*H04R 19/06* (2006.01)
*H04R 31/00* (2006.01)
*H04R 7/02* (2006.01)
*H04R 23/00* (2006.01)

(52) U.S. Cl.
CPC .................. *H04R 7/02* (2013.01); *H04R 23/00* (2013.01); *H04R 31/006* (2013.01); *Y10T 29/49005* (2015.01)

(58) Field of Classification Search
CPC ........ H03H 3/02; H04R 19/00; H04R 19/005; H04R 19/016; H04R 19/04; H04R 23/006; H04R 25/00; H04R 31/00; H04R 31/003; H04R 2201/0257
USPC ............... 381/174, 175; 29/24.42, 592.1, 594
See application file for complete search history.

(56) References Cited

U.S. PATENT DOCUMENTS

| 6,812,620 | B2 * | 11/2004 | Scheeper | ............... | H04R 19/04 381/174 |
| 8,081,783 | B2 * | 12/2011 | Chien | .................... | H04R 19/04 381/174 |
| 2009/0034760 | A1 * | 2/2009 | Minamio | ............. | H04R 19/005 381/175 |

* cited by examiner

*Primary Examiner* — Brian Ensey
(74) *Attorney, Agent, or Firm* — Rosenberg, Klein & Lee (57) ABSTRACT

A manufacturing method of a sensor device integrated with ultrasonic transducer and microphone is to form a first support structure, a back plate, a second support structure, a membrane and electrodes on a substrate. The substrate is divided into a first region and a second region. The first electrode, the third electrode, a part of the back plate, a part of the second support structure and a part of the membrane that are above the first region form the ultrasonic transducer. The first support structure, the second electrode, the fourth electrode, a part of the back plate, a part of the second support structure and a part of the membrane that are above the second region form the microphone. The ultrasonic transducer and the microphone are simultaneously manufactured.

7 Claims, 8 Drawing Sheets

SENSOR DEVICE INTEGRATED WITH ULTRASONIC TRANSDUCER AND MICROPHONE AND MANUFACTURING METHOD THEREOF

CROSS-REFERENCE TO RELATED APPLICATIONS

This application claims the benefit of Taiwan patent application No. 103111188, filed on Mar. 26, 2014, the disclosure of which is incorporated herein in its entirety by reference.

BACKGROUND OF THE INVENTION

1. Field of the Invention

The present invention relates to a sensor device, and more particularly to a sensor device and a manufacturing method thereof. The sensor device is integrated with an ultrasonic transducer and a microphone.

2. Description of Related Art

A conventional capacitive ultrasonic transducer has a substrate, a membrane, a first electrode and a second electrode. The substrate has a groove. The membrane is mounted on the substrate and covers the groove. The first electrode is mounted in the groove. The second electrode is mounted on the membrane and above the first electrode to form a capacitor structure. When the first electrode or the second electrode receives an AC (alternating current) signal, the membrane is then driven to vibrate in high frequency and create ultrasonic waves. Besides, the membrane can vibrate when the membrane receives environmental ultrasonic waves. Then the charge distribution on the electrodes changes to induce a capacitance variation. The capacitance variation can be used to perform position measurement, speed measurement or other physical measurements. However, the conventional capacitive ultrasonic transducer is adapted for ultrasonic frequency only, which cannot be used for sound frequency audible for humans. The function of the conventional capacitive ultrasonic transducer is thus limited.

A conventional capacitive microphone is adapted to sense sound waves audible for humans. However, the conventional ultrasonic transducer and the microphone are separate and independent components and are manufactured by totally different methods. In addition, the materials and the structures of them are different from each other.

SUMMARY OF THE INVENTION

An objective of the present invention is to provide a manufacturing method of a sensor device that is integrated with an ultrasonic transducer and at least one microphone. The ultrasonic transducer and the microphone are simultaneously manufactured and made of same materials. As a result, high cost and low quality, which results from different structures and different materials, is thus overcome.

The manufacturing method of the present invention comprises the steps of:

preparing a substrate having a first region and a second region;

forming a first support structure on the first region;
forming a back plate on the first support structure, wherein the back plate extends above the second region;
pressure relief gap is formed between the back plate and the second region;
the back plate has an electrode-forming region above the first region of the substrate and multiple sound holes above the second region of the substrate; and
the sound holes communicate with the pressure relief gap;
forming a first electrode on the electrode-forming region of the back plate and forming a second electrode on the back plate above the second region of the substrate;
forming a second support structure on the back plate, wherein the second support structure has a first opening and a second opening, the first electrode and the second electrode are respectively exposed from the first opening and the second opening;
forming a membrane on the back plate to cover the first opening and the second opening; and
forming a third electrode and a fourth electrode on the membrane, wherein the third electrode is above the first electrode, the fourth electrode is above the second electrode;
the first electrode, the third electrode, apart of the back plate, apart of the second support structure and a part of the membrane that are above the first region of the substrate forming the ultrasonic transducer; and
the first support structure, the second electrode, the fourth electrode, a part of the back plate, a part of the second support structure and a part of the membrane that are above the second region of the substrate forming the microphone.

The method of the present invention utilizes a lamination technique and micro-electromechanical system (MEMS) technique to simultaneously manufacture the first support structure, the back plate, the second support structure, the membrane, the electrodes and other components to combine the ultrasonic transducer and the microphone together.

The manufacturing method of the present invention is simple and can be processed in MEMS and roll-to-roll manufacturing methods. The combination quality for the ultrasonic transducer and the microphone is improved. By a roll-to-roll technique, the method of the present invention can rapidly produce the sensor device for mass production and cost down.

Another objective of the present invention is to provide a sensor device that is manufactured by the above method, such that the sensor device is integrated with the ultrasonic transducer and the microphone. The sensor device is applicable for both ultrasonic waves (above 20000 Hz) and sounds audible for humans (20-20000 Hz). The sensor device operating in ultrasonic frequency can accomplish three-dimensional position measurements. Multiple microphones can form a microphone array. The microphone array is adapted for acoustic source localization. The sensor device with both of the ultrasonic transducer and the microphone is a unique non-contact sensor. Therefore, the sensor device of the present invention can be widely used in medical instruments and electronic products, i.e. non-contact control panel, 3-dimensional mouse, proximity switch, light switches, etc.

DETAILED DESCRIPTION OF THE PREFERRED EMBODIMENT

Figure 1:
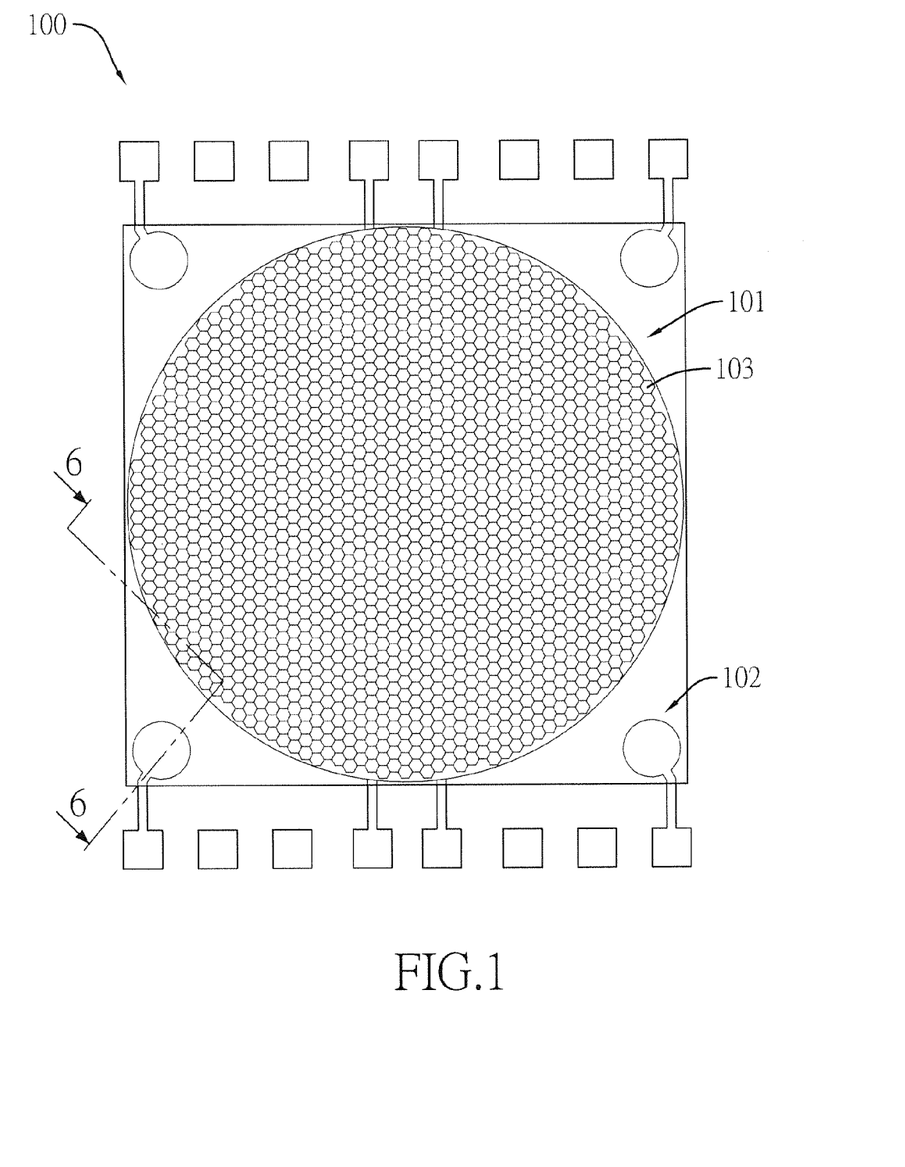
FIG. 1 is a schematic top view of an embodiment of the sensor device of the present invention.

With reference to FIG. 1, the sensor device 100 of the present invention comprises an ultrasonic transducer 101 and at least one microphone 102. The ultrasonic transducer 101 and the microphone 102 are formed on a common substrate and can be simultaneously made by the manufacturing method of the present invention. The ultrasonic transducer 101 comprises one or multiple ultrasonic transducer units 103. The multiple ultrasonic transducer units 103 are shaped into hexagons and are densely arranged. Please note that the following description takes one ultrasonic transducer unit 103 and one microphone 102 as an example for explaining the manufacturing method of the present invention.

Figure 2A:
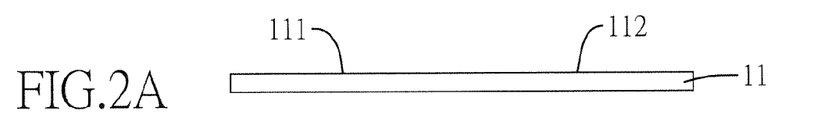
FIG. 2A is a schematic cross-sectional view of a substrate.

With reference to FIG. 2A that discloses a partial view of the sensor device of the present invention, a first step of the manufacturing method is to prepare a substrate 11. The substrate 11 is used as a common substrate for the ultrasonic transducer and the microphone. The substrate 11 is flexible and can be made of glass, silica gel, resins, plastics, polyester, polyimide, photoresist or polymer materials. A surface of the substrate 11 is divided into a first region 111 and a second region 112. The first region 111 is provided to manufacture the ultrasonic transducer. The second region 112 is provided to manufacture the microphone.

Figure 2B:
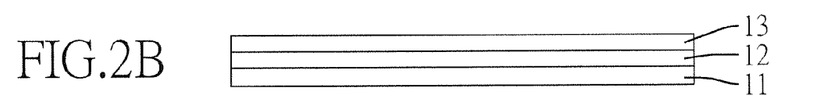
FIG. 2B is a schematic cross-sectional view showing that a first polymer layer is formed on the substrate.

With reference to FIG. 2B, a second step is to form a first polymer layer 12 on the first region 111 and the second region 112 of the substrate 11 by a roll-to-roll technique. In this embodiment, the first polymer layer 12 is a dry-film photoresist, such as SU-8. A surface of the first polymer layer 12 is attached to a release layer 13 that is pervious to ultraviolet light. The roll-to-roll technique is to exert a roller on the release layer 13, and then move the roller to laminate the first polymer layer 12 on the surface of the substrate 11, such that the first polymer layer 12 and the substrate 11 can adhere to each other.

Figure 2C:
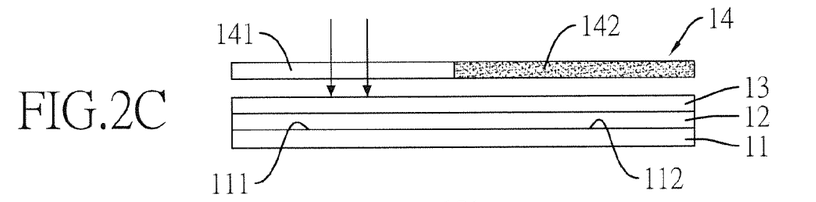
FIG. 2C is a schematic cross-sectional view disclosing that the first polymer layer in FIG. 2B is exposed to ultraviolet light.

After the first polymer layer 12 adheres to the substrate 11, with reference to FIG. 2C, a third step is to expose the first polymer layer 12 to ultraviolet light. In the exposure step, a photomask 14 is placed above the first polymer layer 12. Ultraviolet light is projected onto the first polymer layer 12 through the photomask 14. In this embodiment, the photomask 14 has a light transmission portion 141 and a shielding portion 142. The light transmission portion 141 is disposed above the first region 111 of the substrate 11, such that the first region 111 can be exposed to ultraviolet light. The shielding portion 142 is disposed above the second region 112 of the substrate 12, such that the second region 112 is sheltered from ultraviolet light. Hence, a part of the first polymer layer 12 on the first region 111 can react with ultraviolet light to be solidified and securely adhere to the first region 111 of the substrate 11.

Figure 2D:
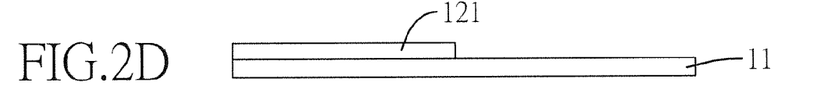
FIG. 2D is a schematic cross-sectional view showing that the first polymer layer in FIG. 2C is etched to form a first support structure.

After the exposure step, with reference to FIG. 2D, a fourth step is to remove the release layer 13 from the first polymer layer 12 and etch the first polymer layer. A part of the first polymer layer that is unexposed to ultraviolet light is removed by a developing solution. The solidified first polymer layer remains on the first region 111 to form a first support structure 121, wherein the first support structure 121 is flexible. Besides the ultraviolet light exposure and the etching, optionally, the first support structure 121 can be formed by imprint lithography, inkjet printing or screen printing.

Figure 2E:
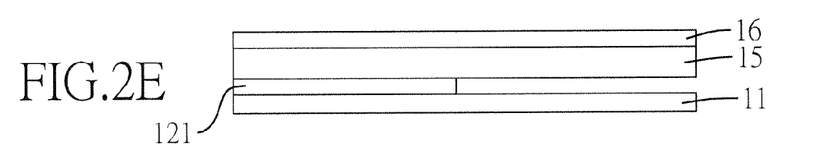
FIG. 2E is a schematic cross-sectional view showing that a second polymer layer is formed on the first support structure.

After the first support structure 121 is formed, with reference to FIG. 2E, a fifth step is to form a second polymer layer 15 on the first support structure 121. The second polymer layer 15 is attached to a release layer 16 by roll-to-roll technique.

Figure 2F:
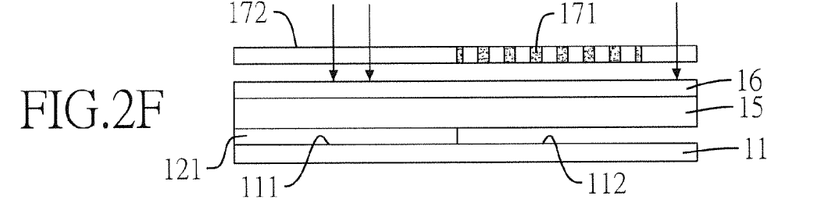
FIG. 2F is a schematic cross-sectional view showing that the second polymer layer in FIG. 2E is exposed to ultraviolet light.

With reference to FIG. 2F, a sixth step is to expose the second polymer layer 15 to ultraviolet light. In this exposure step, a photomask 17 is placed above the second polymer layer 15. The photomask 17 has multiple shielding portions 171 disposed above the second region 112. The rest portion of the photomask 17 is a light transmission portion 172. Hence, a part of the second polymer layer 15 that is exposed to ultraviolet light is solidified to adhere to the first support structure 121. Optionally, the second polymer layer 15 can be solidified by baking.

Figure 2G:
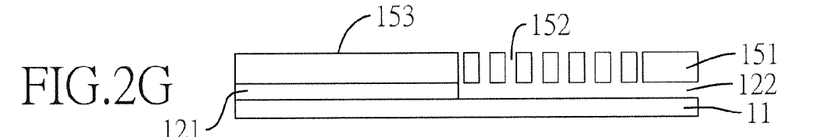
FIG. 2G is a schematic cross-sectional view showing that the second polymer layer in FIG. 2F is etched to form a back plate.
Figure 3:
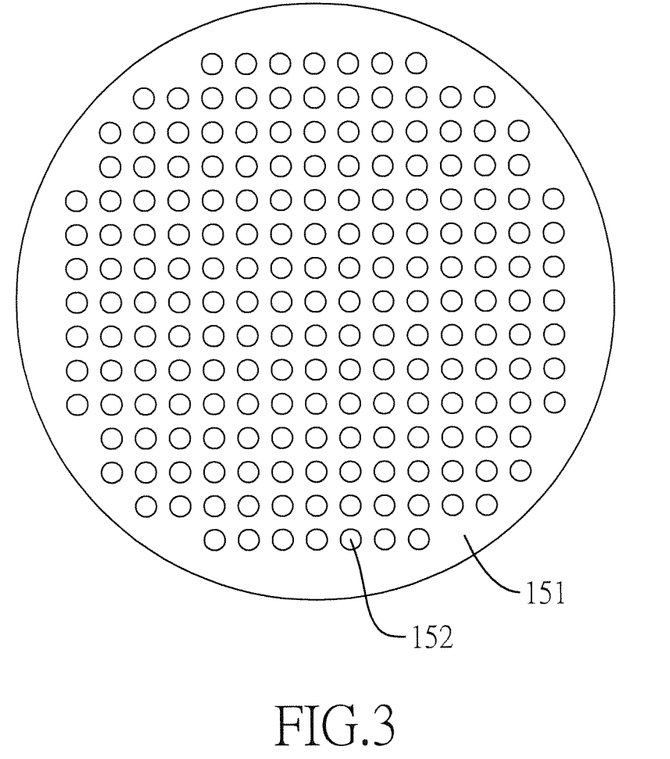
FIG. 3 is a schematic top view of the back plate and the sound holes.

After exposing the second polymer layer 15, with reference to FIG. 2G a seventh step is to remove the release layer 16 from the second polymer layer 15 and process an etching step. During the etching step, the part of the second polymer layer 15 that is unexposed to ultraviolet light is removed by a developing solution. The solidified second polymer layer remains to form a back plate 151, wherein the back plate 151 is flexible. A part of the back plate 151 is mounted on the first support structure 121, and the other part of the back plate 151 extends above the second region 112 of the substrate 11. A pressure relief gap 122 is formed between the back plate 151 and the second region 112 of the substrate 11. With reference to FIG. 3, the back plate 151 has multiple sound holes 152 above the second region 112, and the sound holes 152 communicate with the pressure relief gap 122. The positions of the sound holes 152 respectively correspond to the positions of the shielding portions 171 of the photomask 17 as illustrated in FIG. 2F. An electrode-forming region 153 is defined on the back plate 151 above the first region 111 of the substrate 11. Besides the ultraviolet light exposure and the etching, optionally, the back plate 151 can be formed by imprint lithography, inkjet printing or screen printing.

Figure 2H:
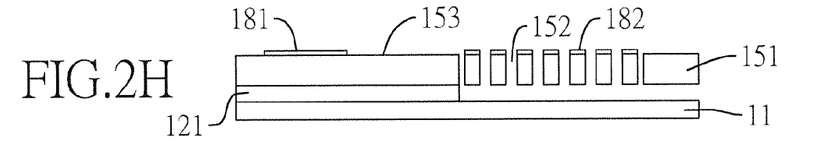
FIG. 2H is a schematic cross-sectional view showing that a first electrode and a second electrode are formed on the back plate.

After the back plate 151 and the sound holes 152 are formed, with reference to FIG. 2H, an eighth step is to form a first electrode 181 on the electrode-forming region 153 and form a second electrode 182 on the back plate 151 above the second region 112. The first electrode 181 and the second electrode 182 can be made by deposition, sputtering, lithography, screen printing or inkjet printing.

Figure 2I:
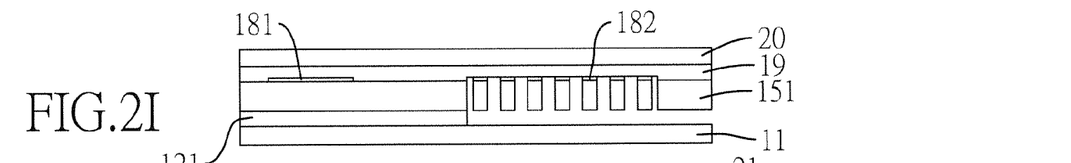
FIG. 2I is a schematic cross-sectional view showing that a third polymer layer is formed on the back plate to cover the first electrode and the second electrode.

After the first electrode 181 and the second electrode 182 are formed, with reference to FIG. 2I, a ninth step is to form a third polymer layer 19 on the back plate 151, wherein the third polymer layer 19 covers the first electrode 181 and the second electrode 182. A surface of the third polymer layer 19 is attached to a release layer 20 pervious to ultraviolet light.

Figure 2J:
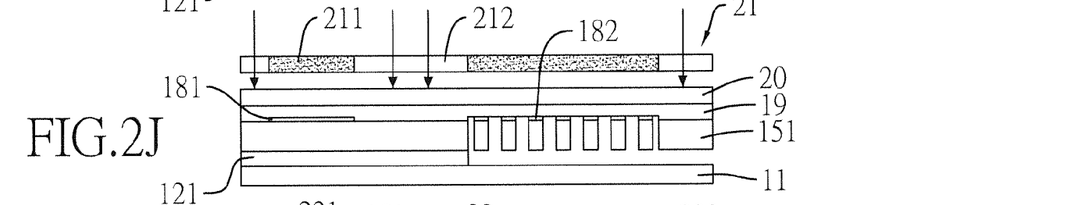
FIG. 2J is a schematic cross-sectional view showing that the third polymer layer in FIG. 2I is exposed to ultraviolet light.

With reference to FIG. 2J, a tenth step is to expose the third polymer layer 19 to ultraviolet light. In this exposure step, a photomask 21 is placed above the third polymer layer 19. The photomask 21 has multiple shielding portions 211 respectively disposed above the first electrode 181 and the second electrode 182. The rest portion of the photomask 21 is a light transmission portion 212.

Figure 2K:
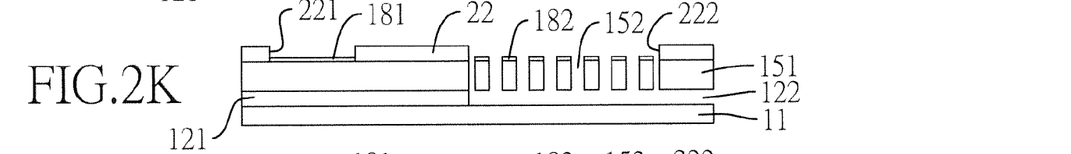
FIG. 2K is a schematic cross-sectional view showing that the third polymer layer in FIG. 2J is etched to form a second support structure.

After exposing the third polymer layer 19, with reference to FIG. 2K, an eleventh step is to remove the release layer 20 from the third polymer layer 19 and process an etching step. During the etching step, the part of the third polymer layer that is unexposed to ultraviolet light is removed by a developing solution to form a first opening 221 and a second opening 222. The second opening 222 communicates with the sound holes 152. The first electrode 181 and the second electrode 182 are respectively exposed from the first opening 221 and the second opening 222. The solidified third polymer layer remains to form a second support structure 22. The second support structure 22 is flexible. Besides the ultraviolet light exposure and the etching, optionally, the second support structure 22 can be formed by imprint lithography, inkjet printing or screen printing.

Figure 2L:
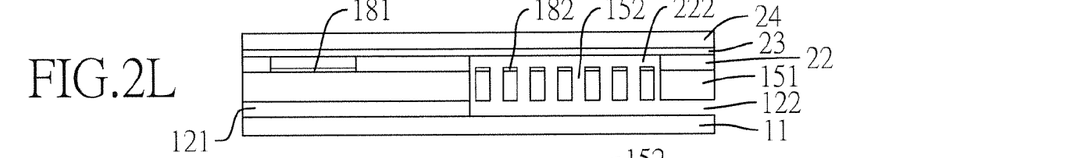
FIG. 2L is a schematic cross-sectional view showing that a fourth polymer layer is formed on the second support structure.

After the second support structure 22 is formed, with reference to FIG. 2L, a twelfth step is to form a fourth polymer layer 23 on the second support structure 22. The fourth polymer layer 23 covers the first opening 221 and the second opening 222. A surface of the fourth polymer layer 23 is attached to a release layer 24 pervious to ultraviolet light.

Figure 2M:
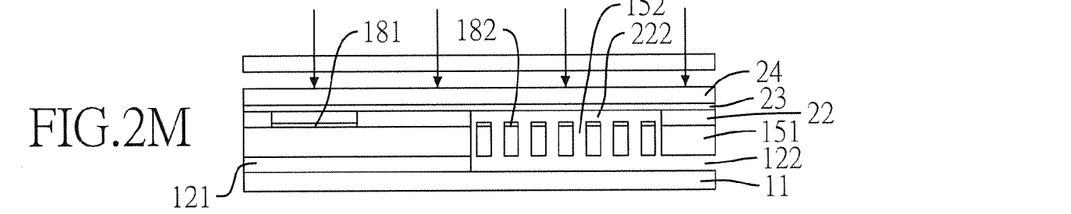
FIG. 2M is a schematic cross-sectional view showing that the fourth polymer layer in FIG. 2L is thoroughly exposed to ultraviolet light.

With reference to FIG. 2M, a thirteenth step is to thoroughly expose the fourth polymer layer 23 to ultraviolet light, such that the fourth polymer layer 23 is completely solidified to adhere to the second support structure 22.

Figure 2N:
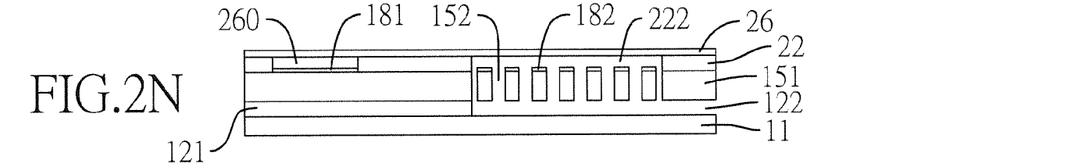
FIG. 2N is a schematic cross-sectional view showing that the membrane is formed.

With reference to FIG. 2N, a fourteenth step is to remove the release layer 24 from the fourth polymer layer 23. The solidified fourth polymer layer forms as a membrane 26 that can vibrate. A cavity 260 is formed among the membrane 26, the first electrode 181 and the second support structure 22.

Figure 2O:
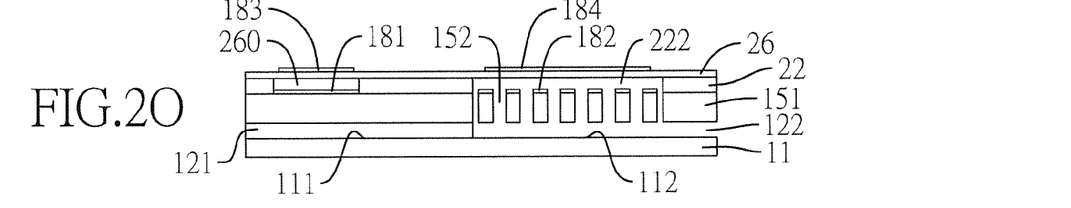
FIG. 2O is a schematic cross-sectional view showing that a third electrode and a fourth electrode are formed on the membrane.

After removing the release layer 24, with reference to FIG. 2O, a fifteenth step is to form a third electrode 183 and a fourth electrode 184 on a surface of the membrane 26, wherein the third electrode 183 is above the first electrode 181, and the fourth electrode 184 is above the second electrode 182. The third electrode 183 and the fourth electrode 184 can be made by deposition, sputtering, lithography, screen printing or inkjet printing. The electrodes 181-184 can be composed of conductive oxide film, indium tin oxide (ITO) film, zinc oxide (ZnO) film, carbon nanotube or silver ink.

Figure 6:
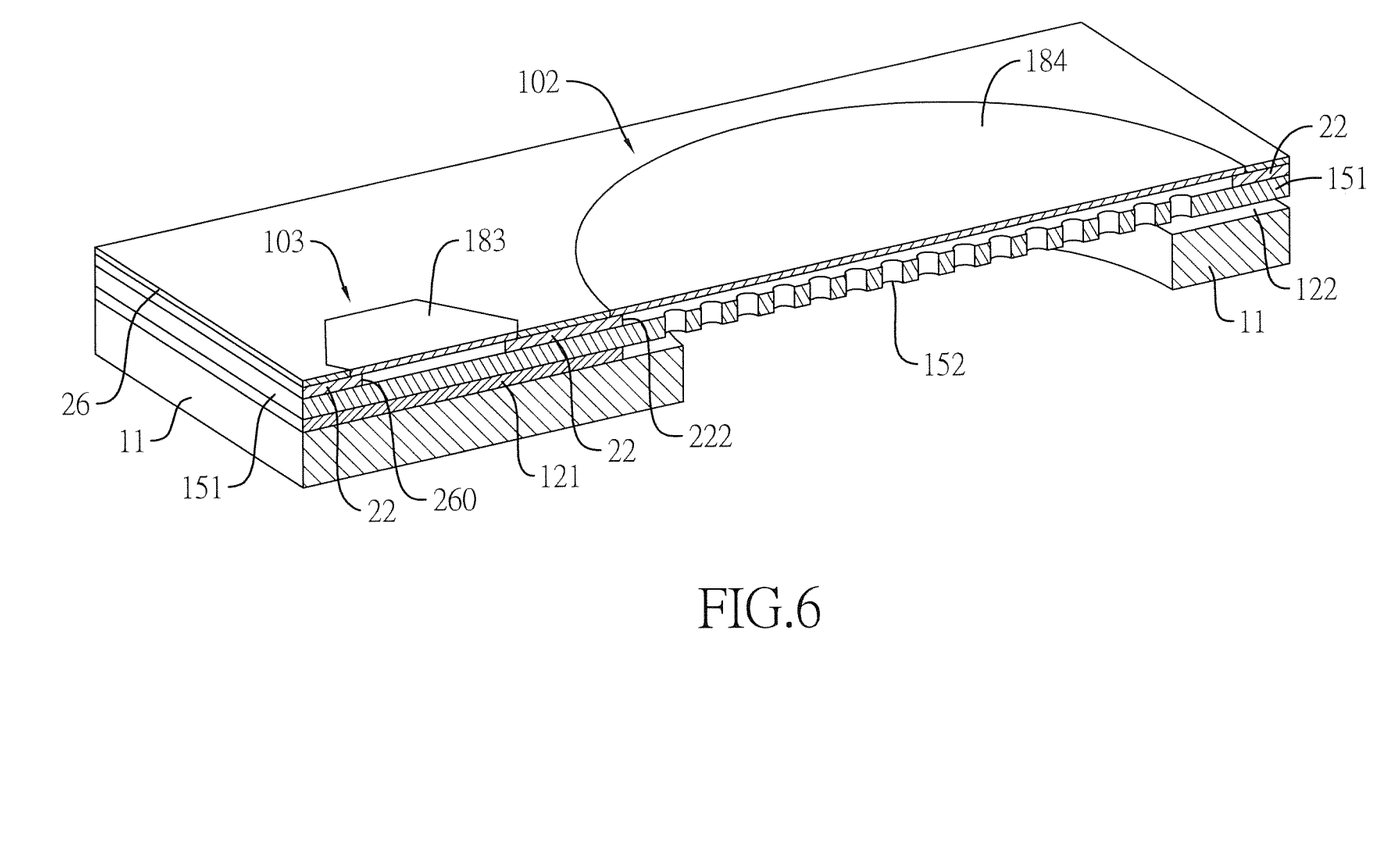
FIG. 6 is a schematic cross-sectional view of FIG. 1.

After the third electrode 183 and the fourth electrode 184 are formed. the manufacturing method is done and thus the sensor device of the present invention is made. With reference to FIG. 6, the partial cross-sectional view will assist in realizing the structure of the sensor device. FIG. 6 roughly discloses a single ultrasonic transducer unit 103 and a microphone. Please note that the third electrode 183 and the fourth electrode 184 are very thin and thus their thickness is not displayed.

Figure 4:
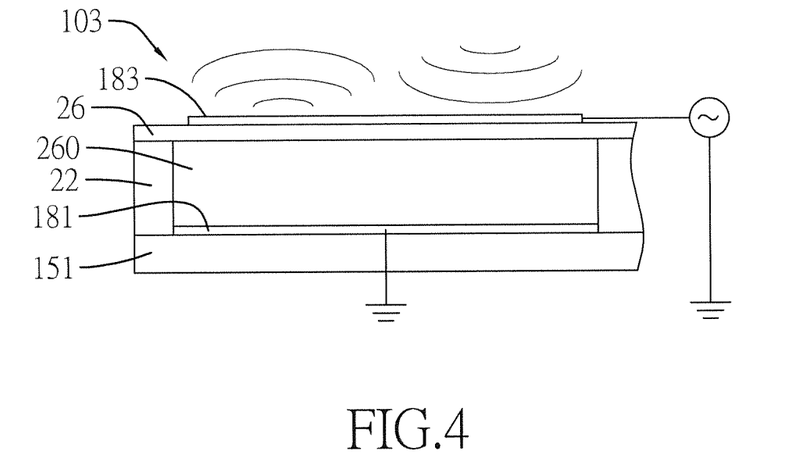
FIG. 4 is an operational view of the ultrasonic transducer.

With reference to FIGS. 1, 2O and 4, the first electrode 181, the third electrode 183, the cavity 260, a part of the back plate 151, a part of the second support structure 22 and a part of the membrane 26 that are above the first region 111 of the substrate 11 collectively form a ultrasonic transducer unit 103. The cavity 260 provides spaces for the membrane 26 to vibrate. The first electrode 181 and the third electrode 183 are equivalent to a capacitor. The third electrode 183 is adapted to be electrically connected to a control device. The control device could provide a driving signal to the third electrode 183. Therefore, according to the driving signal, the membrane 26 is driven to vibrate in high frequency to produce ultrasonic waves. Besides, when the membrane 26 senses an environmental ultrasonic wave, the membrane 26 vibrates to change the charge distribution on the first electrode 181 and the third electrode 183. As a result, a capacitance between the two electrodes 181, 183 changes, and the capacitor constructed by the two electrodes 181, 183 correspondingly generates an AC (alternating current) signal. By calculating the change of the capacitance, position measurement, speed measurement and other physical measurements can be performed.

Figure 5:
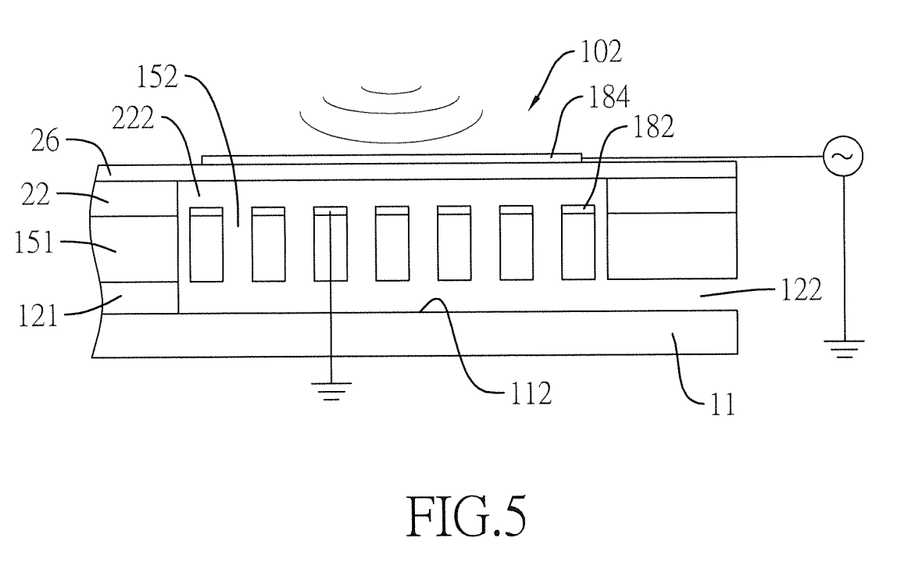
FIG. 5 is an operational view of the microphone.

With reference to FIGS. 1, 2O and 5, the first support structure 121, the second electrode 182, the fourth electrode 184, the second opening 222, the sound holes 152, the pressure relief gap 122, a part of the back plate 151, a part of the second support structure 22 and a part of the membrane 26 that are above the second region 112 of the substrate 11 collectively form a microphone 102. When the membrane 26 senses an environmental sound wave, the membrane 26 vibrates to change the charge distribution on the second electrode 182 and the fourth electrode 184. A capacitance between the two electrodes 182, 184 thus changes, and the capacitor constructed by the two electrodes 182, 184 correspondingly generates an AC (alternating current) signal. The change of the capacitance can be used to perform a voice measurement.

Figure 7:
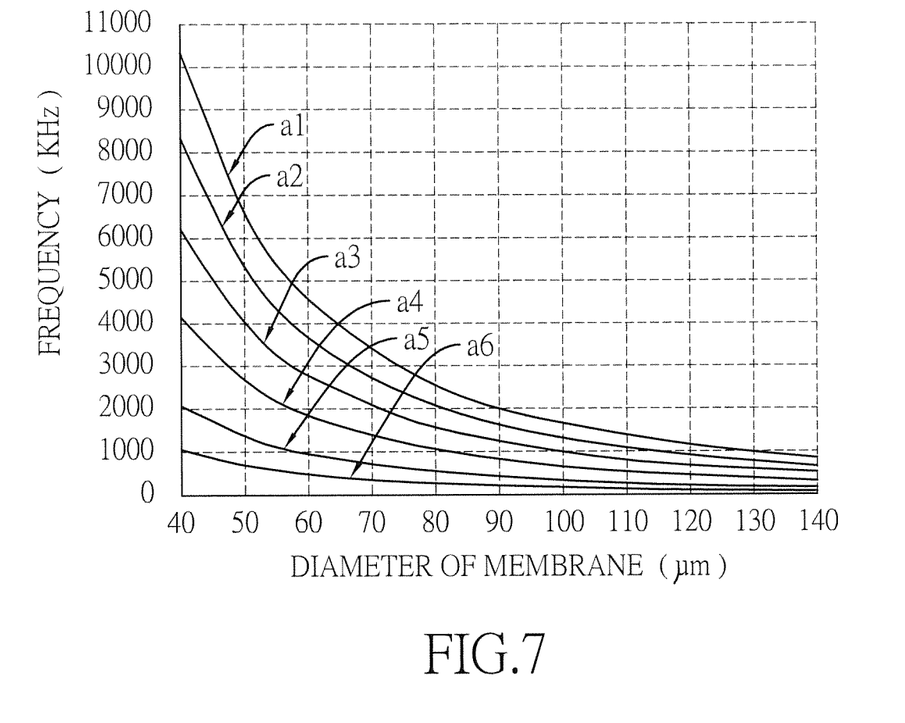
FIG. 7 is a natural frequency waveform diagram of the membrane of the ultrasonic transducer.

According to experimental result, the resonance frequency of the ultrasonic transducer unit 103 and the microphone 102 vary with the thickness of the membrane 26. With reference to FIG. 7, a natural frequency waveform diagram of the hexagonal-shaped membrane of the ultrasonic transducer is shown. Six curved lines a1-a6 are measured from different thicknesses of 0.5 µm, 1 µm, 2 µm, 3 µm, 4 µm and 5 µm of the membrane. The horizontal coordinate (X axis) stands for the diameter of the hexagonal-shaped membrane of each ultrasonic transducer unit 103. The vertical coordinate (Y axis) stands for the resonance frequency.

Figure 8:
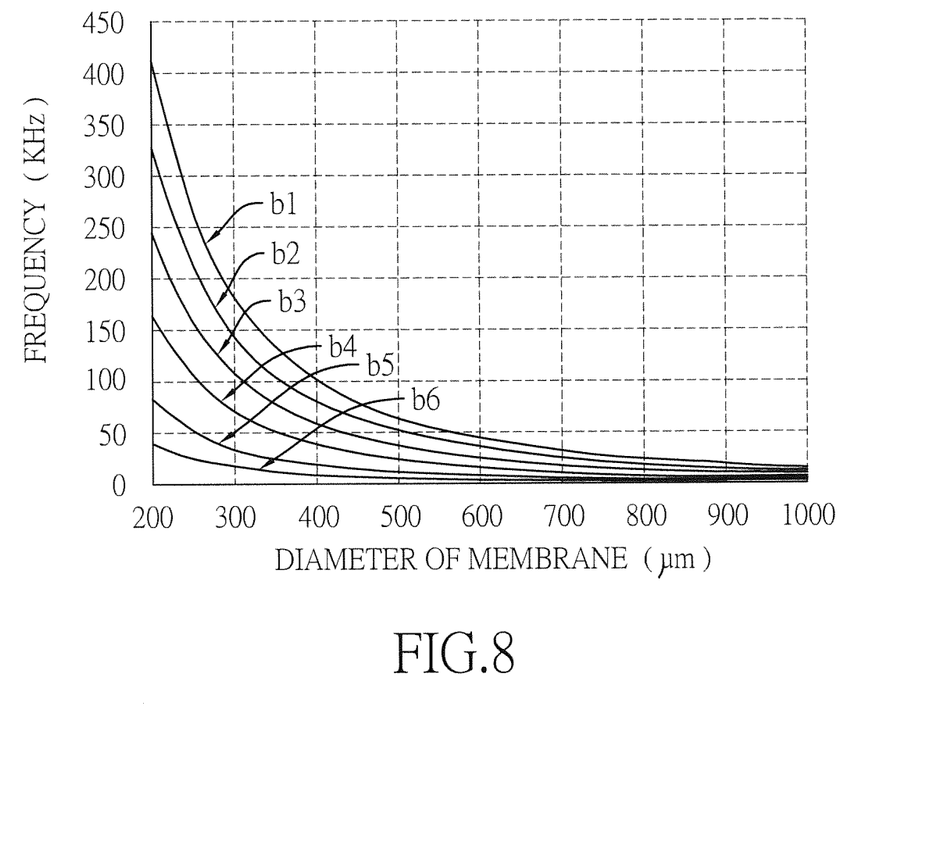
FIG. 8 is a natural frequency waveform diagram of the membrane of the microphone.

With reference to FIG. 8, a natural frequency diagram of the circular-shaped membrane of the microphone is shown. Six curved lines b1-b6 are measured from different thicknesses of 0.5 µm, 1 µm, 2 µm, 3 µm, 4 µm and 5 µm of the membrane. The horizontal coordinate (X axis) stands for the diameter of the circular-shaped membrane of the microphone. The vertical coordinate (Y axis) stands for the resonance frequency.

The resonance frequency of the ultrasonic transducer unit 103 is higher than that of the microphone 102, such that the sensor device of the present invention is adapted for high frequency and low frequency measurements.

In conclusion, the substrate 11, the first support structure 121, the back plate 151, the second support structure 22 and the membrane 26 are commonly shared by the ultrasonic transducer 101 and the microphone 102. That would be helpful to reduce the volume of the sensor device and simplify the manufacture process. Besides, the substrate 11, the first support structure 121, the back plate 151, the second support structure 22 and the membrane 26 are composed of polymer materials and thus have advantages of flexible structure, light weight and low manufacturing cost.

What is claimed is:

1. A manufacturing method for a sensor device integrated with an ultrasonic transducer and a microphone, the method comprising the steps of:
   preparing a substrate having a first region and a second region;
   forming a first support structure on the first region;
   forming a back plate on the first support structure, wherein the back plate extends above the second region;
      a pressure relief gap is formed between the back plate and the second region;
      the back plate has an electrode-forming region above the first region of the substrate and multiple sound holes above the second region of the substrate; and
      the sound holes communicate with the pressure relief gap;
   forming a first electrode on the electrode-forming region of the back plate and forming a second electrode on the back plate above the second region of the substrate;
   forming a second support structure on the back plate, wherein the second support structure has a first opening and a second opening, the first electrode and the second electrode are respectively exposed from the first opening and the second opening;
   forming a membrane on the back plate to cover the first opening and the second opening; and
   forming a third electrode and a fourth electrode on the membrane, wherein the third electrode is above the first electrode, and the fourth electrode is above the second electrode;
   wherein the first electrode, the third electrode, a part of the back plate, a part of the second support structure and a part of the membrane that are above the first region of the substrate collectively form the ultrasonic transducer; and
   wherein the first support structure, the second electrode, the fourth electrode, a part of the back plate, a part of the second support structure and a part of the membrane that are above the second region of the substrate collectively form the microphone.

2. The method as claimed in claim 1, wherein the first support structure is manufactured by the steps of:
   forming a first polymer layer on the first region and the second region of the substrate;
   exposing the first polymer layer via a photomask to solidify the first polymer layer on the first region of the substrate, wherein the photomask has a light transmission portion and a shielding portion, the light transmission portion is disposed above the first region of the substrate, the shielding portion is disposed above the second region, and the first polymer layer on the first region is thus solidified; and
   etching the first polymer layer, wherein the solidified first polymer layer remains on the first region to form the first support structure.

3. The method as claimed in claim 2, wherein the back plate is manufactured by the steps of:
   forming a second polymer layer on the first support structure;
   exposing the second polymer layer via a photomask to solidify the second polymer layer, wherein the photomask for the second polymer layer has multiple shielding portions disposed above the second region, the rest portion of the photomask for the second polymer layer is a light transmission portion, a part of the second polymer layer corresponding to the light transmission portion for the second polymer layer is solidified; and
   etching the second polymer layer, wherein the solidified second polymer layer remains to form the back plate.

4. The method as claimed in claim 3, wherein the second support structure is manufactured by the steps of:
   forming a third polymer layer on the back plate to cover the first electrode and the second electrode;
   exposing the third polymer layer via a photomask to solidify the third polymer layer, wherein the photomask for the third polymer layer has multiple shielding portions disposed above the first electrode and the second electrode, the rest portion of the photomask for the third polymer layer is a light transmission portion, and a part of the third polymer layer corresponding to the light transmission portion for the third polymer layer is solidified; and
   etching the third polymer layer, wherein the solidified third polymer layer remains to form the second support structure.

5. The method as claimed in claim 1, wherein the membrane is manufactured by the steps of:
   forming a fourth polymer layer on the second support structure to cover the first opening and the second opening;
   exposing the fourth polymer layer to solidify the fourth polymer layer, wherein the solidified fourth polymer layer adheres to the second support structure to form the membrane.

6. A sensor device manufactured by the method as claimed in claim 1, wherein the sensor device comprises:
   a substrate having a first region and a second region;
   a first support structure mounted on the substrate;
   a back plate mounted on the first support structure and having an electrode-forming region above the first region and multiple sound holes above the second region;
   a first electrode mounted on the electrode-forming region of the back plate;
   a second electrode mounted on the back plate above the second region of the substrate;
   a second support structure mounted on the back plate and having a first opening to expose the first electrode and a second opening to expose the second electrode;
   a membrane mounted on the back plate and covering the first opening and the second opening;
   a third electrode mounted on the membrane and above the first electrode;
   a fourth electrode mounted on the membrane and above the second electrode;
   the first electrode, the third electrode, a part of the back plate, a part of the second support structure and a part of the membrane that are above the first region of the substrate collectively forming an ultrasonic transducer;
   the first support structure, the second electrode, the fourth electrode, a part of the back plate, a part of the second support structure and a part of the membrane that are above the second region of the substrate collectively forming a microphone.

7. The sensor device as claimed in claim 6, wherein the substrate is flexible and is made of glass, silica gel, resins, plastics, polyester, polyimide, photoresist or polymer materials.

* * * * *